United States Patent [19]

Neumann et al.

[11] Patent Number: 5,249,917
[45] Date of Patent: Oct. 5, 1993

[54] PALLETIZER

[75] Inventors: Irving H. Neumann, Somerville, N.J.;
Timothy E. Goszka, Easton, Pa.;
Kolbjorn Roste, Oslo, Norway

[73] Assignee: Butler Automatic, Inc., Mountainside, N.J.

[21] Appl. No.: 687,118

[22] Filed: Apr. 18, 1991

[30] Foreign Application Priority Data

Apr. 18, 1990 [NO] Norway .................. 901738

[51] Int. Cl.⁵ .............................................. B65G 1/18
[52] U.S. Cl. .................................. 414/799; 414/751;
414/790.2; 414/791.6; 414/792.6; 414/788.5
[58] Field of Search .................. 414/799, 789.8, 789.9,
414/790.2, 791.6, 792, 792.2, 792.3, 792.6,
788.4, 788.5, 788.6, 751

[56] References Cited

U.S. PATENT DOCUMENTS

| | | |
|---|---|---|
| 2,933,313 | 4/1960 | Stobb . |
| 3,612,300 | 10/1971 | Berghgracht . |
| 3,739,924 | 6/1973 | Stobb . |
| 3,757,966 | 9/1973 | Cox et al. . |
| 3,901,392 | 8/1975 | Streckert . |
| 4,018,351 | 4/1977 | Stobb . |
| 4,019,639 | 4/1977 | Stobb . |
| 4,082,174 | 4/1978 | Stobb . |
| 4,083,461 | 4/1978 | Wangermann . |
| 4,096,958 | 6/1978 | Stobb . |
| 4,419,035 | 12/1983 | Stobb . |
| 4,519,740 | 5/1985 | Stobb . |
| 4,658,715 | 4/1987 | Stobb . |
| 4,750,132 | 6/1988 | Pessins et al. . |
| 5,022,813 | 6/1991 | Smith et al. .................. 414/790 |

FOREIGN PATENT DOCUMENTS

| | | |
|---|---|---|
| 20156094 | 11/1984 | European Pat. Off. . |
| 18354 | 3/1960 | Fed. Rep. of Germany . |
| 1109584 | 6/1961 | Fed. Rep. of Germany . |
| 2213120 | 9/1973 | Fed. Rep. of Germany . |
| 272167 | 5/1978 | Fed. Rep. of Germany . |
| 1169449 | 3/1967 | United Kingdom . |

Primary Examiner—David H. Bollinger
Attorney, Agent, or Firm—Mathews, Woodbridge & Collins

[57] ABSTRACT

The present invention is an apparatus useful for palletizing elongated articles including bundles of stacked sheets or signatures. The apparatus of the present invention comprises a frame and a slide system mounted to the frame. The slide system comprises a slide conveyor and a slide support connected to the slide conveyor. There is at least one, and preferably at least two, clamp assemblies connected to the slide support. Each clamp assembly comprises a pair of opposing clamping surfaces with at least one of the clamping surfaces on a clamp, and preferably each clamping surface on an opposing clamp.

23 Claims, 7 Drawing Sheets

PALLETIZER

BACKGROUND OF THE INVENTION

Field of the Invention

The present invention relates to a method and apparatus for moving bundles of sheets, such as sheets or signatures, which are used in the graphic art industry. More particularly, the present invention relates to an apparatus which is useful for transferring one or more bundles at a time to or from a pallet.

Description of Related Art

Various industries, particularly the printing industry, conveniently arrange stacks of sheets or signatures in bundles. By a stack it is meant a plurality of aligned stacked sheets or signatures which typically come from printing and folding machines. It is a common practice for such stacks of sheets to be compressed and wrapped, or secured by a suitable means such as a plastic strap to form a bundle. The strapped bundle is elongated having a uniform cross-section defined by the perimeter of the sheets or signatures being stacked. A stack is considered to be an aligned plurality of sheets on signatures. A bundle is a strapped stack which typically has been compressed.

In the printing industry the bundles are formed in rapid succession. Typically, signatures move at a rate of up to 80,000 per hour. It is desirable to remove the formed bundles from the bundling area in an organized and efficient manner. This is particularly the case as systems becomes automated.

Apparatus and methods for moving bundles are continuously being developed to improve their performance and keep up with related equipment in the line, including signature stacking and bundling machines.

A representation of the state and progress of technology related to moving bundles is shown in the patent art including patents such as U.S. Pat. Nos. 3,757,966; 4,018,351; 4,019,639; 4,083,461; 4,096,958; 4,419,035; 4,519,740 and 4,658,715, as well as German references DE 2721675 and DE 2213120. This representation of the art details a variety of approaches and problems which are faced in attempts to solve them.

Of interest is U.S. Pat. No. 4,083,461 which discloses an apparatus having a piston/cylinder drive associated with gripping fingers to grip and hold stacks for bundles of printed matter during transference to packing boxes or pallets. Also of interest are U.S. Pat. Nos. 4,519,749 and 4,658,715 which disclose palletizers using a gripper having clamps useful to engage the longitudinal ends of bundles for transport to a pallet. This embodiment of U.S. Pat. No. 4,519,749 is used in combination with a continuous conveyor for lifting a bundle vertically and transferring it horizontally. U.S. Pat. No. 4,419,035 addresses the problem of sensing the bundle and the location where the bundle is to be placed on the pallet.

SUMMARY OF THE INVENTION

The present invention is an apparatus useful for palletizing elongated articles including bundles of stacked sheets or signatures. The apparatus is useful in applications where sheets or signatures are fed at high speeds of up to 80,000 or more per hour and typically from 10,000 to 60,000 per hour.

The apparatus of the present invention comprises a frame and a slide system mounted to the frame. The slide system comprises a slide conveyor and a slide support connected to the slide conveyor. There is at least one, and preferably at least two, clamp assemblies connected to the slide support. Each clamp assembly comprises a pair of opposing clamping surfaces with at least one of the clamping surfaces on a clamp, and preferably each clamping surface on an opposing clamp. The opposing clamping surfaces face each other. There are preferably means to compensate for residual clamp assembly movement after a support surface is encountered by the article to be deposited.

There is a compression means to move at least one of the clamping surfaces toward the opposing clamping surface, and a release means to move at least one of the clamping surfaces away from the clamping surface. The compression means move each opposing clamping surface toward the opposing clamp surface and release means move each clamping surface away from the clamping surface.

The slide conveyor preferably comprises at least one driven chain and preferably two, driven chains which are interconnected with a slide support to translate the slide support, preferably vertically. A preferred slide support has at least one driven chain between a free rolling sprocket and a driven sprocket, with the slide support interconnected to the chain. There is a driving means interconnected to the driven sprocket. A slip clutch is interconnected to the driving means. When the driven chain meets resistance, it stops moving and residual motion in the driving means is compensated for by the slip clutch. There is a means to sense residual motion in the driving means and stop the driving means.

In an alternate embodiment there can be a sensor extending from the clamp assembly. The sensor is disposed to intercept an article which will provide support for the clamped article Upon descending, the sensor detects and signals the clamp assembly to stop descending at a point where the clamped article rests upon the intercepted support article.

The preferred clamp assemblies useful in the present invention comprise a rail interconnected to the slide support. There is at least one clamp slidably mounted on the rail and having one clamping surface located thereon. Preferably there is an opposing clamp having the opposing clamping surface located thereon, with the opposing clamp preferably being located on the rail. The one clamping surface and opposing clamping surface are preferably parallel, planar surfaces.

The compression means is interconnected to at least one clamp and preferably comprises a piston assembly, preferably pneumatic, between the one clamp and the opposing clamp and interconnected with the one clamp to force the one clamp toward the opposing clamp. One of the clamps can have a stop means to limit or prevent the clamp from travelling.

In specific embodiments, there is a means to rotate the one clamp and opposing clamp on each rail about an axis generally through each respective rail, transverse to the slide system. Preferably, each rail and clamp assembly can axially rotate independently.

In yet an alternate embodiment, all of a plurality of clamp assemblies can rotate together with the slide support about an axis parallel to the rails (i.e., a horizontal axis).

In an another embodiment, there can be a means for translating clamp assemblies about an axis parallel to the slide system, (i.e., a vertical axis).

There is a further means to translate the slide system, on which the clamp assembly is mounted, horizontally. Preferably this means comprises at least one rail and means to move the slide system along the rail.

In typical operation the clamp assembly is lowered via the slide system. The clamps are located so that bundles are between the one clamp and the opposing clamp. The clamps are compressed and the clamped bundles are lifted by the slide system. The slide system moves horizontally until the clamped bundle is over a pallet. The clamp assembly is lowered until the clamped bundles intercepts the pallet or bundles already on the pallet.

A control means senses resistance to lowering of the clamp assembly and controllably stops the slide. The clamps release the bundle and the slide system reverses this procedure to return to obtain additional bundles.

The present invention has several advantages. Initially, the invention can comprise two or more clamp assemblies enabling it to pick a whole layer of bundles up and deposit them simultaneously onto a pallet and correspondingly remove a whole layer of bundles from a pallet. This almost eliminates the need to have to sense the location of adjacent bundles during automatic palletizing. By picking up to four bundles at a time, the apparatus of the present invention can be used with extremely rapid printing lines since four bundles will have to be formed during the time which the palletizing apparatus of the present invention is lifting and transporting up to four bundles to a pallet. Because each of the multiple clamps is independently operated, multiple stacks can be picked up which have different lengths.

The resistance sensing means of the present invention, preferably the slip clutch, avoids the necessity of having to locate the surface of the article upon which the clamped articles are going to be deposited. For example, the surface of the pallet need not be determined, the clamp assemblies will continue down until resistance is met by the clamped articles, at which point the slide conveyor such as a driven chain, will automatically stop and the driving means will slip with the slip clutch. The slipping will be sensed and the driving means stopped. The clamps will release and rise to pick up the next layer of bundles to be palletized. This prevents the clamp assembly from driving the clamped articles into the support.

The use of the clearance adjuster further enables the opposing clamps to compensate for differences in stack length without the clamps destroying the end of the bundle. It additionally compensates for supports which may be associated with a loading table.

DESCRIPTION OF THE PREFERRED EMBODIMENTS

The present invention will be understood by those skilled in the art by reference to FIGS. 1-6. A preferred embodiment of the present invention having four clamp assemblies is shown in perspective in FIG. 1.

Figure 1:
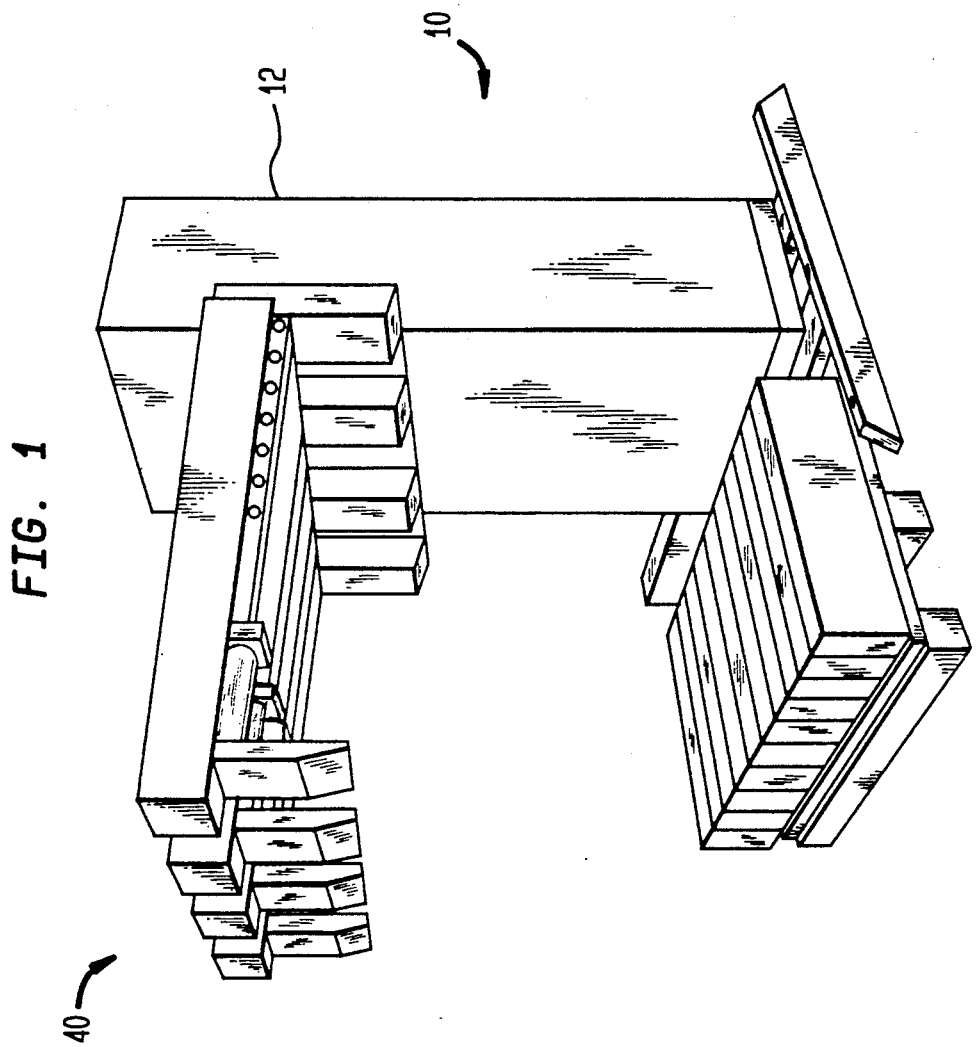
FIG. 1 is a view in perspective of a preferred embodiment of the present invention containing four clamp assemblies.
Figure 2:
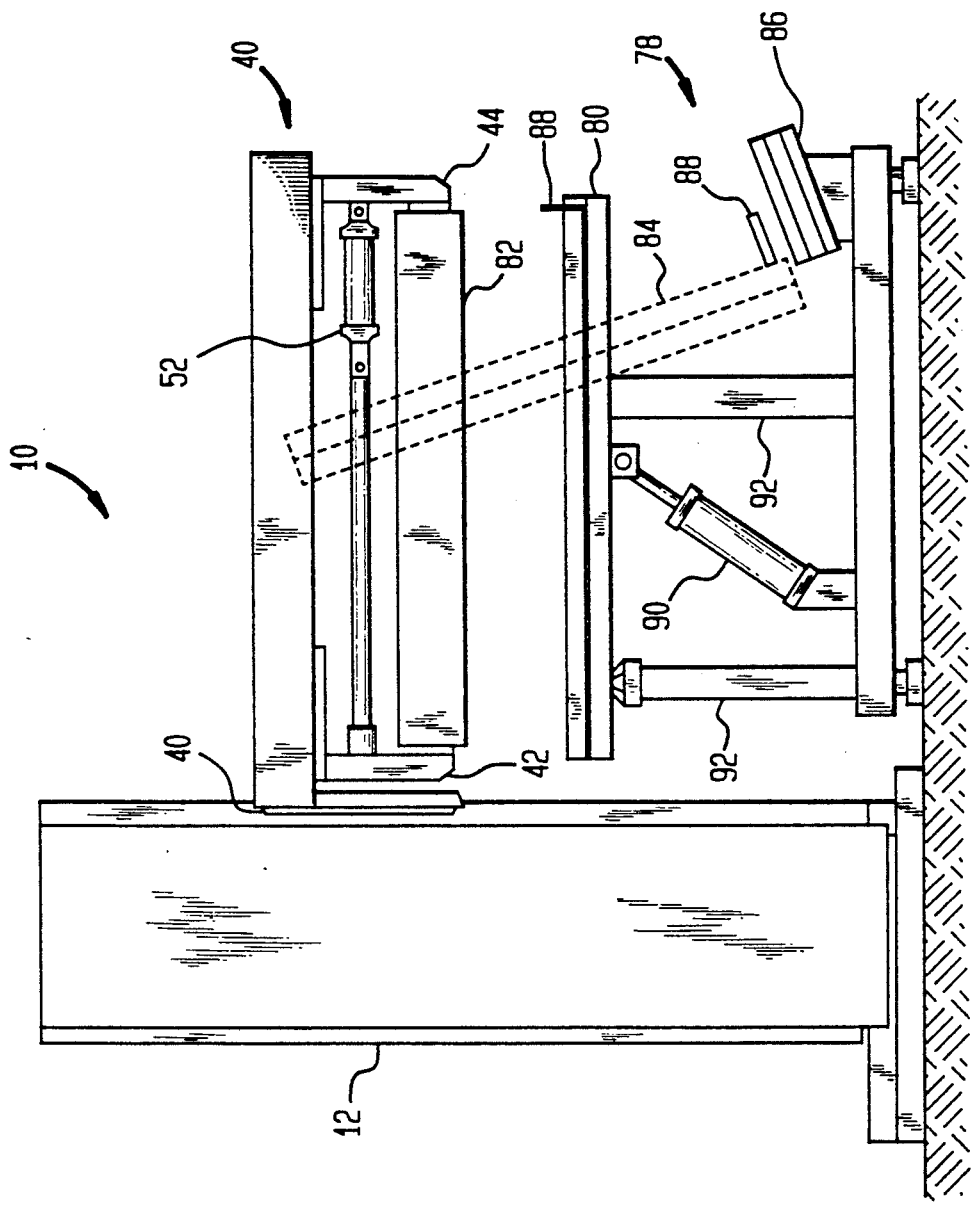
FIG. 2 is a side view of the embodiment shown in FIG. 1, also showing a loading table for use in association with either a horizontal or vertical stacking machine.

FIG. 2 illustrates a side view of a palletizer of the type shown in FIG. 1. The palletizer can have at least one clamp assembly and preferably has from one to four, and more preferably from two to four clamp assemblies, with four clamp assemblies most preferred.

Figure 3:
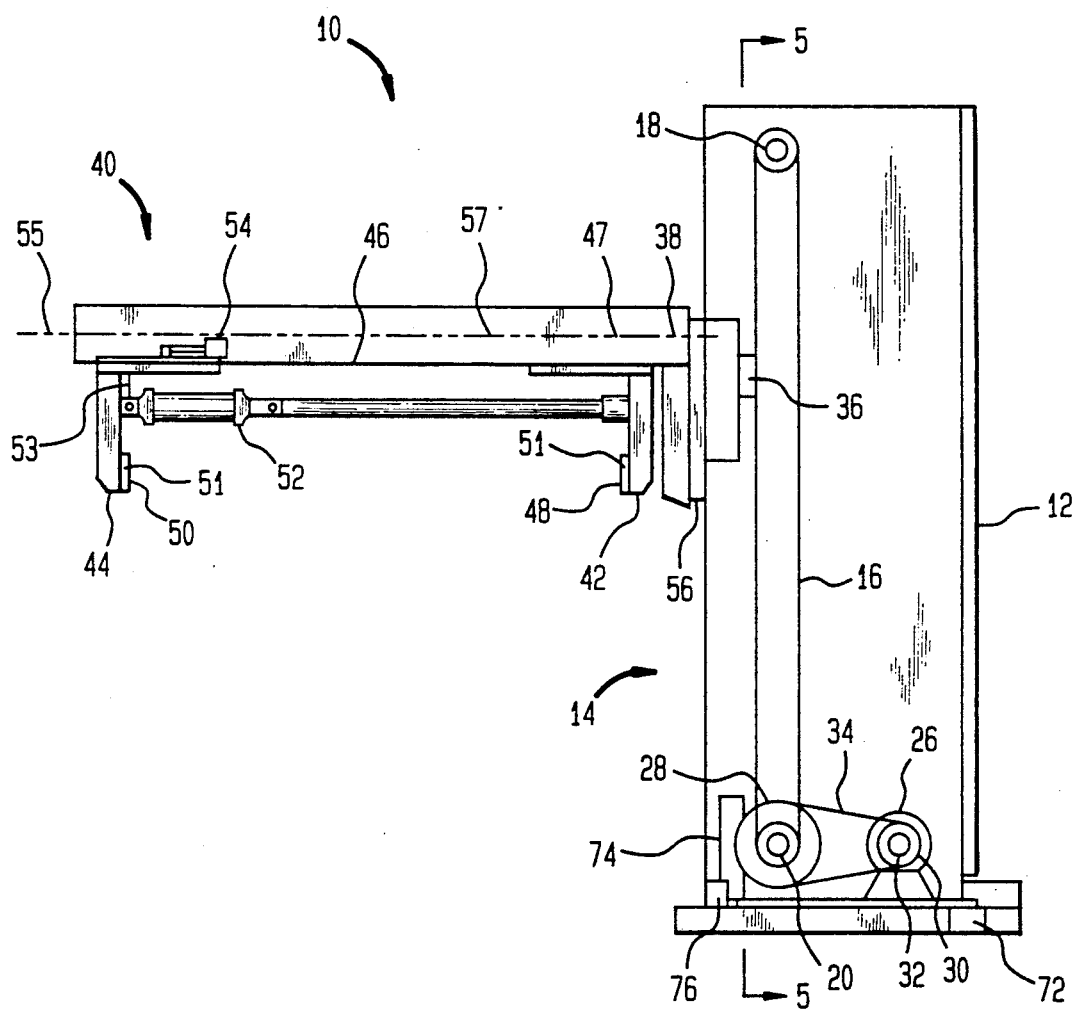
FIG. 3 is a side view of the present invention showing the clamping system and slide assembly.
Figure 4:
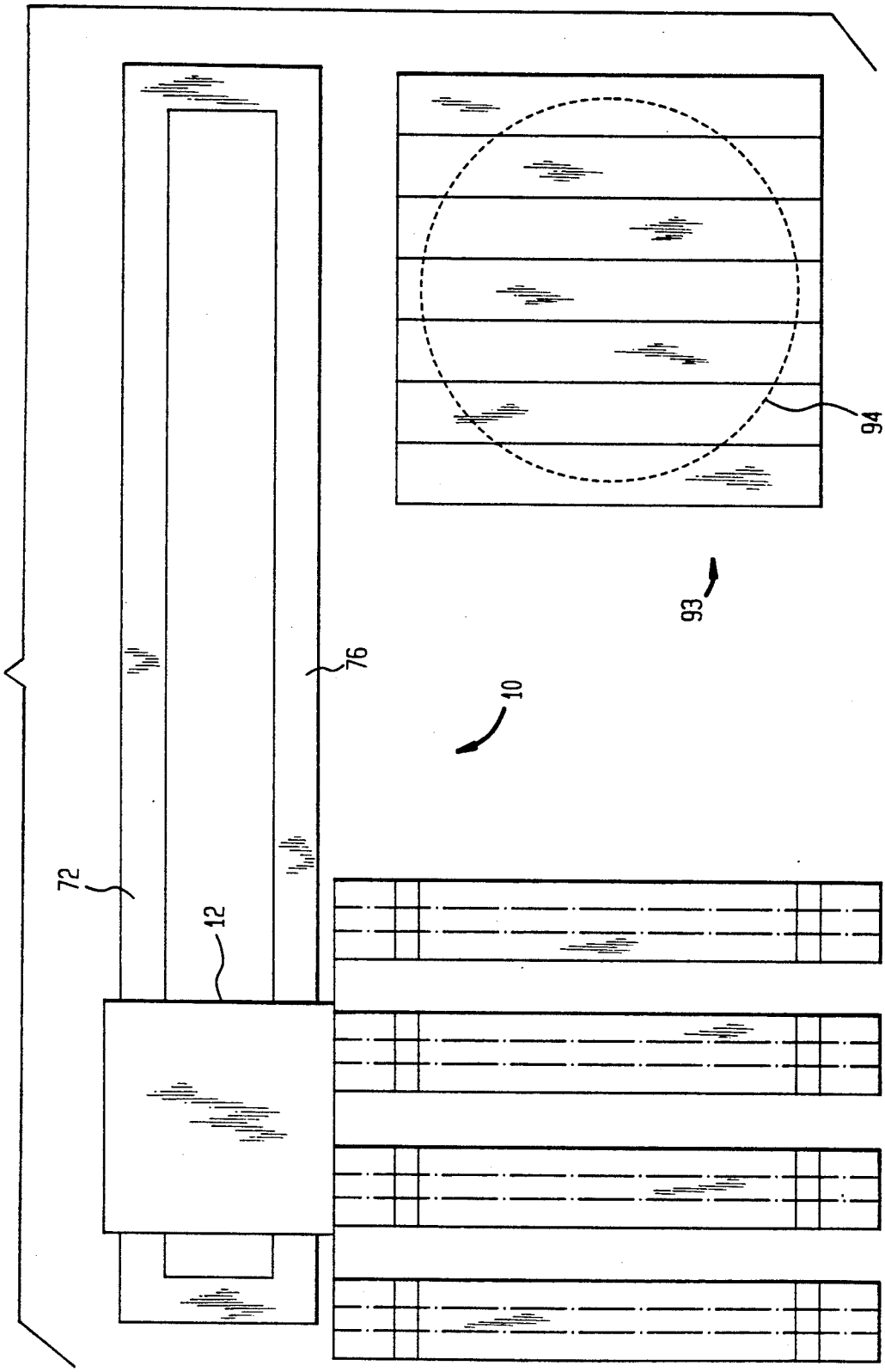
FIG. 4 is top view of the embodiment shown in FIG. 3.
Figure 5:
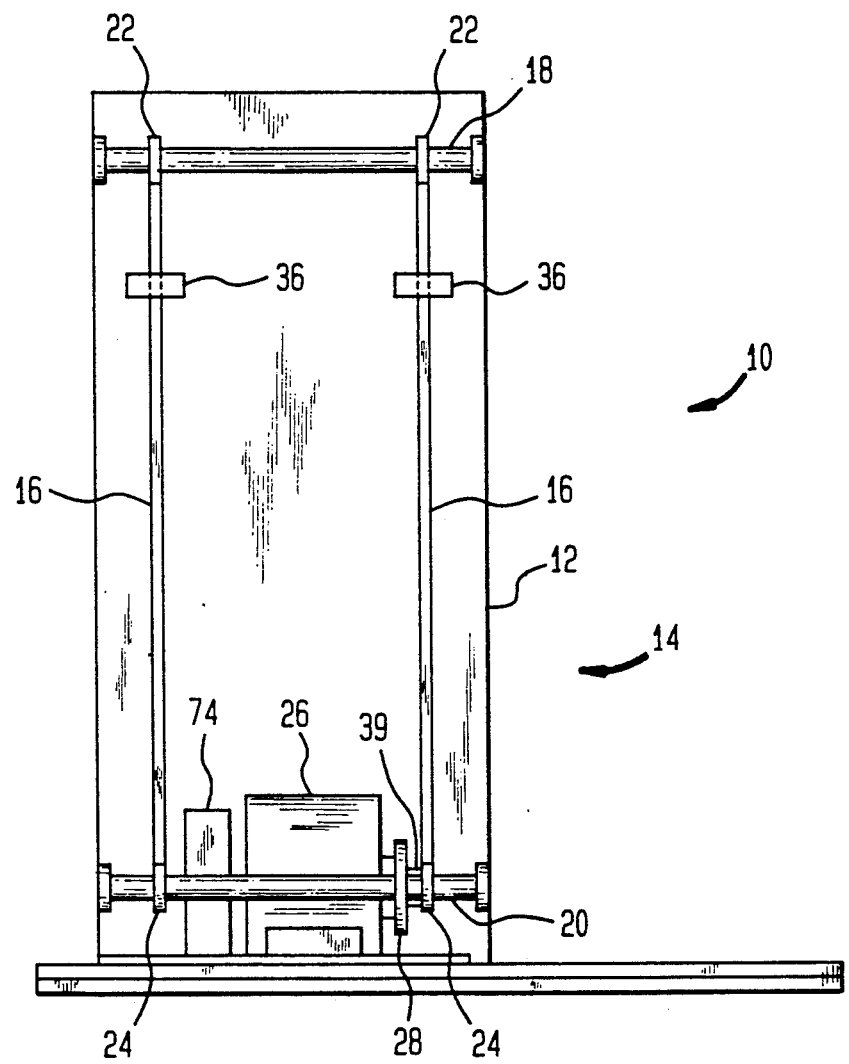
FIG. 5 is a sectional view along lines 5—5 of FIG. 3.

Referring to FIGS. 1, 2, 3 and 5, there is shown the palletizer 10 of the present invention. The palletizer 10 comprises a frame or housing 12. There is a slide system 14 mounted on frame 12. The slide system is illustrated in FIGS. 3 and 5. The slide system 14 comprises a slide conveyor which is preferably a driven chain 16, and most preferably two driven chains 16 which are preferably endless chains. In the embodiment shown in FIG. 5 there are two driven chains 16 extending between free chain shaft 18 and driven chain shaft 20. The driven chains 16 pass over free rolling sprockets 22 mounted on free chain shaft 18, and driven sprockets 24 on driven chain shaft 20. Free chain shafts 18 and driven chain shaft 20 rotate about their axis.

There is a suitable drive means, such as drive motor 26, interconnected with driven chain shaft 20 to drive chains 16 about driven sprockets 24. In a specific and preferred embodiment, the drive motor 26 is interconnected with a slide motor sprocket 28 located on driven chain shaft 20. There is a slide motor shaft sprocket 30 located on motor shaft 32. Slide chain motor 34 is preferably an endless chain interconnected between slide motor shaft sprocket 30 and slide motor sprocket 28. Slide motor sprocket 28 is mounted on driven chain shaft 20. Upon energizing drive motor 26, chain 16 is driven via slide motor chain 34, slide motor sprocket 28, and driven sprockets 24.

The slide system further comprises at least one slide support 36, such as slide supports 36 connected to chain 16. Slide support plate 38 can be mounted or connected to slide support 36. There is preferably a slip clutch 39 associated with the slide motor sprocket 28. If the slide support 36 moves downward and meets resistance, the slip clutch 39 will enable the drive means to continue but the chain 16 and slide supports 36 will be stopped by the resistance. The slip clutch 39 can be used as part of a system to sense resistance to movement of the clamp assembly 40 along the support 36 slide and allow the clamp assembly 40 to stop immediately without residual force or movement from the drive means. Residual motion of the drive means relative to the slide can be detected by a motion sensor and the drive means stopped.

There at least two and preferably four clamp assemblies 40. The clamp assemblies are connected directly to slide supports 36, indirectly through a slide support plate 38, or other suitable connection means. Preferably, each clamp assembly is removably connected to the slide support plate 38. In this way, the number of clamp assemblies 40 can be varied. The clamp assemblies 40 comprise opposing clamps, including one clamp 42 and opposing clamp 44. The clamps can be slidably mounted on clamp rail 46. The clamp rail 46 is connected to a clamp rail housing 47 which can be mounted on slide support means, such as slide support plate 38.

At least one clamp 42 is slidably mounted on clamp rail 46. The opposing clamp 44 can also be mounted on clamp rail 46 as well. Clamps 42 and 44 have opposing clamp surfaces 48 and 50, respectively. One clamping surface 48 and opposing clamping surface 50 can be made of any suitable material which will clamp the article, i.e., a bundle, to be clamped without damaging the bundle. Preferably, the one clamping surface 48 and opposing clamping surface 50 are the surfaces of an elastomeric or rubber bumper 51. The one clamping surface 48 and opposing clamping surface 50 are preferably parallel, flat planar surfaces which face each other. This corresponds to the substantially parallel flat surfaces of bundles of signatures.

There is preferably a compression means interconnected to at least one clamp. Preferably, the compression means is connected between the one clamp 42 and opposing clamp 44. The opposing clamp 44 can have a stop 53 to restrict movement of that clamp. The compression means then forces the one clamp 42 toward the stopped opposing clamp 44.

FIGS. 1 through 3 show the compression means as a piston, preferably a pneumatic piston 52, interconnected between one clamp 42 and opposing clamp 44. The piston assembly is between one clamp 42 and opposing clamp 44 and interconnected with the one clamp 42 to force the one clamp 42 toward opposing clamp 44.

In preferred embodiments, there can be a clearance adjuster 54 interconnected to the clamp opposite the clamp which will be substantially moved by piston 52. In FIG. 3 the clearance adjuster 54 is shown interconnected to opposing clamp 44. This enables the opposing clamp 44 to move toward and away from the one clamp 42 independently of one clamp 42. In the preferred embodiment the clearance adjuster 54 stops the movement of opposing clamp 44 toward one clamp 42. Optionally, there can be a stop 53 toward the end of rail 46. The clearance adjuster 54 itself can be a small pneumatic piston connected to opposing clamp 44. The purpose of this is that so when the one clamp 42 and opposing clamps 44 are spread apart and the clamp assembly is lowered by the slide to pick up a bundle, the opposing clamp 44 can move outward to give additional clearance beyond the far end of the bundle from the one clamping surface 48. Additionally the clearance adjuster can securely seat opposing clamp surface 50 against the bundle to be clamped. If there is an additional support at the end of the bundle to which surface 51 intercepts, such as support fingers 88 on a support table 84, the clearance adjuster assures that the one clamp 42 is opposing the opposing clamp 44 and not pushing the bundle against the support fingers.

Upon applying a signal to the pneumatic piston, the one clamp and opposing clamp 42 and 44 are forced toward each other so that the one clamping surface 48 and opposing clamping surface 50 can clamp tightly at the respective ends of a bundle of signatures. The clearance adjuster 54 simultaneously causes the opposing clamp surface 50 to move toward the one clamping surface when the clamps are signaled to clamp onto a bundle.

In specific embodiments of the present invention, particularly when the apparatus contains only one clamping assembly, there can be an axial rotating means, schematically shown as reference character 56. This can enable the clamp assembly 40 to rotate the one clamp and opposing clamp on the rail about an axis 57 generally through the rail and shown transverse to the slide system 14. In essence, the slide system has a vertical axis, while the clamping assembly system has a horizontal axis with the clamping assembly being able to rotate about a horizontal axis. In embodiments comprising a plurality of clamping assemblies 40, each rail and clamp assembly can rotate about the rail axis independently.

In yet an alternate embodiment of the present invention, there can be a rotation means which can rotate all of the clamp assemblies about the horizontal axis. Referring to FIG. 1, the plane through all of the clamp rails 46 would be parallel to the horizontal axis. Upon rotation about axial rotation means 56 could turn the plurality of clamping assemblies 40 can rotate so that a plane through clamp rails 46 would be vertical.

Figure 6:
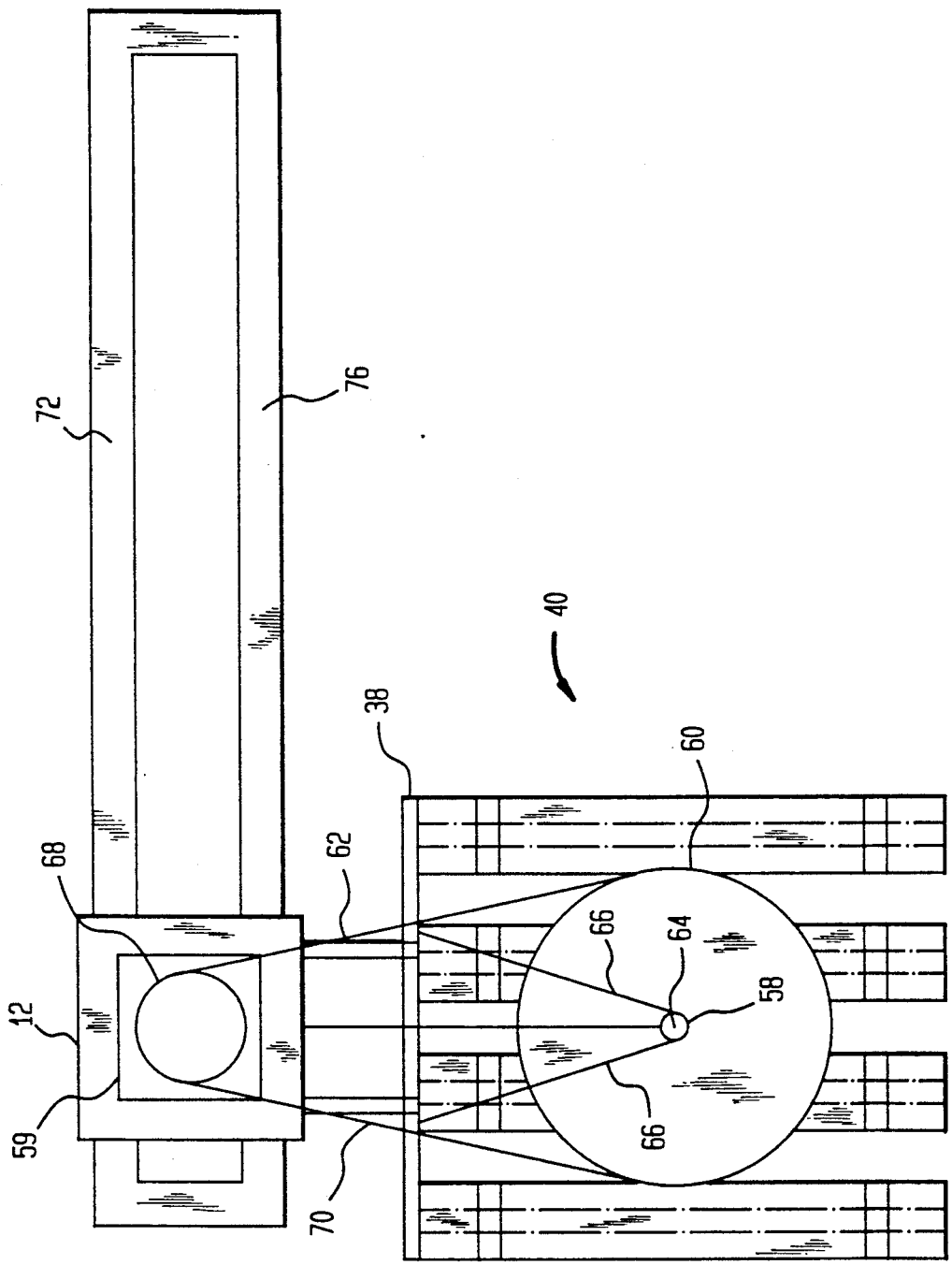
FIG. 6 is a top view of an alternate embodiment showing means to rotate four clamping assemblies on a slide support.

Referring to FIG. 6, yet another embodiment of the invention is shown. Here there is means for translating the clamp assemblies 40 about a transverse rail axis, which is perpendicular to a plane through the rail 46. This is shown as a translation motor 59 connected to a clamp assembly sprocket 60. Slide support plate 38 is connected to slide support 36 via translation extensions 62. The translation extension 62 can be connected to clamp assembly support 64 via struts 66.

Translation motor sprocket 68 is connected to clamp assembly sprocket 60 through translation chain 70. By controlling translation motor 59 the clamp assembly 40 can rotate about the transverse rail axis 58, i.e., the vertical axis. In this way a plurality of clamped bundles can be stacked in successively different directions on a pallet.

There is a means to translate the slide system 14 and with it the clamp assembly 40. Typically, this is a means by which the slide system is translated horizontally. The preferred means is to translate the slide system 14 along at least one slide assembly rail 72. This can be accomplished by a slide assembly motor 74. This can cause the slide assembly to move on rail 72 driven by a rack and pinion drive 76 or other suitable drive.

The apparatus of the present invention can be used in conjunction with horizontal or vertical stackers both of which are commonly known in the art. For example, reference is made to U.S. Pat. No. 5,022,813, issued Jun. 11, 1991, for a representative commercially useful horizontal stacking machine. Vertical stacking machines are likewise commercially available such as the SMC Model V3000/V5000 vertical stacker series sold by the Stacker Machine Co. of Mountainside, N.J. FIG. 2 illustrates the apparatus of the present invention with a stock table 78 which can be adapted to receive bundles from a horizontal or vertical stacking machine. The table is shown in solid lines as horizontal 80 to receive bundles of signatures 82 from a horizontal stacking machine. The stock table 78 is shown in phantom view as a vertical table 84 to receive bundles from a vertical stacking machine. The vertical table 84 has a horizontal or base support 86 on which the bottom edge of the bundle rests. The table 78 has support fingers 88. The table 80, 84 and support 86 are made up of a plurality of rollers.

When the bundles are fed from a horizontal stacker they are received on the table 80. When they are received from a vertical stacker they are supported on horizontal support 86 with the length of the table resting against the vertical table 84. Table piston 90 helps to dampen the motion of vertical table 84 as it pivots onto table supports 92 into the horizontal position. The bundle is supported on support fingers 88 as it rotates from the vertical to the horizontal position. The horizontal support 86 remains in place A vertical stacker is considered a nominal name for a stacker at an angle of from 45° to 0° to the vertical.

The operation of the preferred embodiment will be understood by reference to FIGS. 1 through 3.

Bundles of stacked signatures are fed to table 80 in the horizontal position or its phantom view in the vertical position. The stacked bundles have a bundle axis perpendicular to the major plane of the individual signatures which form the stack. The stacked bundles are fed so that the stack bundle axis extends in the same direction as from the one clamp 42 to the opposing clamp 44. Stacks are fed from a vertical stacker onto vertical table 84 which is put into a horizontal position 80. During the transition the stacks of bundles 82 are held by support fingers 88.

Once there are a desirable number of stacked bundles 82 on the horizontal table 80, the apparatus of the present invention can be manually or automatically controlled to operate. The one clamp 42 and the opposing clamp 44 are in an open position, i.e., spread apart by piston 52. The opposing clamp 44 can be further separated by use of clearance adjuster means such as piston 54. This is particularly important where the bundles 82 are fed from a vertical stacker. In this case, the support fingers 88 are in contact with a corresponding bundle end. In order to avoid the one clamp 42 from compressing the bundle against support fingers 88, the clearance adjuster 54 can be used to assure that the bundle will be pulled away from the support fingers 88 and pressed against opposing clamp surface 50 when one clamping surface 48 is brought toward the opposing clamp 44.

The slide system is operated and the chains 50 are driven so that chain 16 moves down with slide support plate 38 toward bundle 82. The clamps are set to a desired height based on the height of the table 80 in the horizontal position Upon the clamps compressing to a desired pressure, the bundle 82 is secured between the clamps. Each clamp assembly 40 self-adjusts to the axial bundle length. Upon sensing that each of the clamps securely has a bundle 82 clamped therein, the chain 16 is signaled to move upward away from table 80.

The multiple clamp assemblies 40, each carrying a bundle, are ready to be moved to a desired location to deposit the bundle, typically on a pallet. The slide system then translates by suitable means, such as slide assembly motor 74 on slide assembly rail 72, using a suitable drive such as a rack and pinion drive 76. The whole slide system moves toward pallet 93 which is at a desired location known to the machine. Once the slide system 14 is at a position wherein the bundles are above the pallet 93, the chain 16 is signaled to move vertically down to deposit the clamped bundles onto the pallet.

In a preferred embodiment, once the bundles are in contact with the pallet, the slide chain 16 stops moving. The slip clutch 39 which can be located on driven shaft 20 at slide motor sprocket 28 allows slide motor sprocket 28 to continue to rotate. This continued motion of the motor sprocket after the chain 16 stops is sensed and the drive motor 26 is stopped. This results in several advantages. In particular, there is no need to sense the height at which a bundle will be deposited and released. The machine automatically stops when resistance is encountered. The clutch prevents the clamp assembly from driving the clamp bundles and clamp assembly right into the pallet or layer of bundles immediately beneath it.

Figure 7:
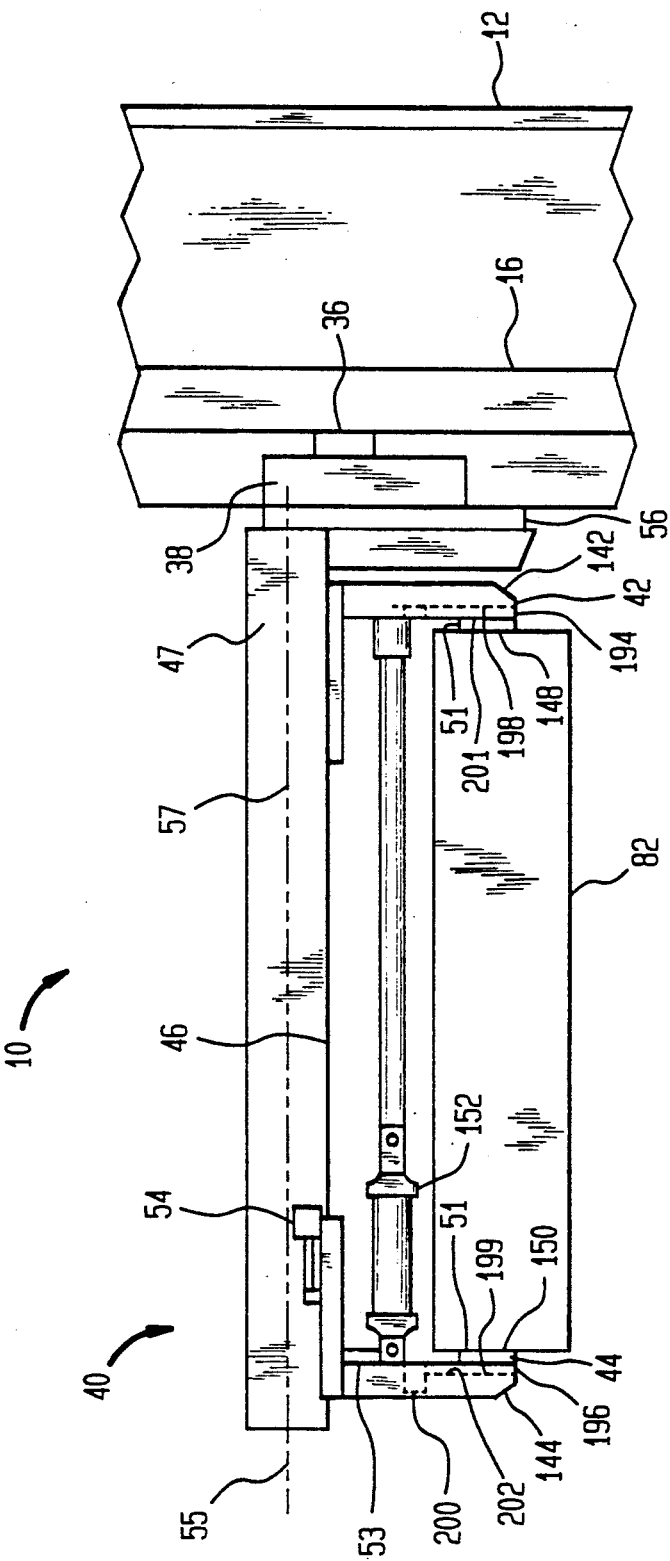
FIG. 7 is an alternate embodiment of the clamp assembly having a clamp sensor slide system. Common reference characters are used for common elements.

A signal means such as clamp sensor slide system can be associated with the one clamp 42 or the opposing clamp 44 as shown in FIG. 7. This sensor senses when the bundle 82 has intercepted a support on which it is to be deposited and signals the drive means to stop. The slide permits the bundle to stop independent of any residual movement by the clamp assembly or slide assembly by the drive means. This sensor can be activated by a pneumatic piston or electrical sensing means.

A specific and preferred clamp sensor slide system is illustrated in FIG. 7. This system can be used in conjunction with the slip clutch assembly to stop the clamp assembly from moving toward the article upon which the bundle will be supported. The slip clutch can be used to stop the clamp assembly if the drive means continues to operate, or as a backup system, and the clamp sensor slide system can be used as the primary system. In this way, when a bundled article is deposited on a support such as a pallet or a layer of clamped articles, i.e., bundles upon layers of bundles, the supporting layer will only see the weight of the oncoming clamped bundles and will substantially not see the downward force of the clamp assembly by the slide system 14, or the force of the drive means.

Referring to FIG. 7, the apparatus can further comprise opposing clamps, one clamp 42 and opposing clamp 44. The one clamp 42 and opposing clamp 44 have one clamp head 142 and opposing clamp head 144, respectively. Each clamp 42 and 44 further comprises a clamp slide 198 and 199 slidably, connected to the respect one clamp head 142 and opposing clamp head 144. The clamp slide in each respective clamp has one clamping surface 148 and opposing clamping surface 150. Preferably, the clamp slides 198 and 199 slide in clamp channels 201 and 202. The channels at clamp ends 194 and 196 stop the slides from slipping out of the channels.

The opposing clamping surfaces can clamp an article, such as bundle 82, by compressing on opposing ends of the bundle using compression means 152. The bundle means can then be moved to a support surface. Typically, the clamp assembly 40 is lowered toward a pallet with clamp ends 194 and 196 being the closest part of the clamp assembly to the support surface. Upon interception with the support surface, the one slide clamp 198 and opposing slide clamp 199 slide away from clamp ends 194 and 196, in corresponding channels 201 and 202 within one clamp head 142 and opposing clamp head 144. There is a slide clamp sensor 200 associated with at least one of the clamp slides 198 and 199. Upon sensing movement of the slides toward the sensor, or upon actual contact with the slide, a signal is sent to control the movement of the clamp assembly. In the preferred apparatus of the present invention the sensor 200 signals the drive means to stop the movement of the slide system and thereby the clamp assembly toward the support surface. In this way, the supported article, such as bundle 82, stops at the support surface while there is residual movement in the clamp assembly 40 and/or slide system 14 is compensated for by the slides 198, 199 moving in channels 201 and 202. The residual movement is sensed the clamp assembly 40 and/or slide system 14 is compensated for by the slides 198, 199 moving in channels 201 and 202. The residual movement is sensed and the clamp assembly is stopped before the weight of the clamp assembly and the force of the drive means associated with the slide system can be asserted on the support surface. The slip clutch 39 associated with the drive means can be used in association with or as a backup to the clamp sensor slide system.

Where it is desired to load layers of bundles 82 in alternating directions where the bundle axis in successive layers is perpendicular, the clamp assemblies 40 can be rotated by use of clamp assembly sprocket 60 as shown in FIG. 6. Of course, the pallet itself can be on a turntable 94 to rotate as desired.

While exemplary embodiments of the invention have been described, the true scope of the invention is to be determined from the following claims.

What is claimed is:

1. An apparatus comprising:
   a frame;
   a slide system mounted to the frame, the slide system comprising:
   a slide conveyor; and
   a slide support connected to the slide conveyor; and
   at least two clamp assemblies connected to the slide support with each clamp assembly comprising:
   a pair of opposing clamping surfaces comprising one clamping surface and an opposing clamping surface, with the one clamping surface and the opposing clamping surface facing each other; and
   a compression means to move at least one of the clamping surfaces toward the opposing clamping surface.

2. The apparatus as recited in claim 1 wherein said compression means further comprises:
   a release means to move at least one of said opposing clamping surfaces away from said opposing clamping surface.

3. The apparatus as recited in claim 1 wherein said slide conveyor comprises at least one driven chain interconnected to said slide support and driving means for driving said at least one driven chain, wherein said at least one driven chain translates said slide support vertically.

4. The apparatus as recited in claim 3 wherein said clamp assemblies further comprise:
   a rail interconnected to said slide support; and,
   at least one clamp slidably mounted on said rail and having said one clamping surface located thereon.

5. The apparatus as recited in claim 4 wherein said clamp assemblies further comprise:
   an opposing clamp slidably mounted on said rail and having said opposing clamping surface located thereon.

6. The apparatus as recited in claim 5 wherein said one clamping surface and said opposing clamping surface are parallel, planar surfaces.

7. The apparatus as recited in claim 5 wherein said compression means is interconnected to said at least one clamp.

8. The apparatus as recited in claim 7 further comprising a clearance adjuster interconnected to said opposing clamp to enable said opposing clamp to move toward and away from said at least one clamp independently of said at least one clamp.

9. The apparatus as recited in claim 5 wherein said compression means comprises a piston assembly between said at least one clamp and said opposing clamp and interconnected with said at least one clamp to force said at least one clamp toward said opposing clamp.

10. The apparatus as recited in claim 9 wherein said piston assembly comprises a pneumatic piston.

11. The apparatus as recited in claim 5 further comprising means to rotate said at least one clamp and said opposing clamp on each rail about an axis transverse to said slide system.

12. The apparatus as recited in claim 11 wherein each rail and each clamp assembly thereon can rotate independently.

13. The apparatus as recited in claim 11 wherein all of said clamp assemblies rotate together with said slide support.

14. The apparatus as recited in claim 5 wherein said driving means of said slide conveyor translates said clamp assemblies along an axis parallel to said slide system.

15. The apparatus as recited in claim 5 wherein said slide system further comprises a means to translate said slide system.

16. The apparatus as recited in claim 15 wherein said means to translate said slide system comprises at least one rail and means to move said slide system along said rail.

17. The apparatus as recited in claim 5 wherein said slide system comprises:
   at least one driven chain between a supported free sprocket and a driven sprocket with said slide support interconnected to said driven chain.
   driving means interconnected to said driven sprocket;
   a slip clutch interconnected to said driving means whereupon when said driven chain meets resistance said driven chain stops moving and residual motion in said driving means is compensated for by said slip clutch.

18. The apparatus as recited in claim 5 wherein said clamp assembly further comprises:
   a sensor extending from said clamp assembly in which there is a clamped article, disposed to intercept a support article upon descending vertically and signal said clamp assembly to stop descending at a point where said clamped article rests upon the intercepted support article.

19. An apparatus comprising:
   a frame;
   a slide system mounted to said frame, said slide system comprising:
   a slide conveyor, comprising:
   at least one driven chain between a supported free sprocket and a driven sprocket with said slide support interconnected to said driven chain;
   driving means interconnected to said driven sprocket;
   a slip clutch interconnected to said driving means whereupon when said driven chain meets resistance said driven chain stops moving and residual motion in said driving means is compensated for by said slip clutch;
   a slide support connected to said slide conveyor;
   at least one clamp assembly connected to said slide support, said clamp assembly comprising:
   a pair of opposing clamping surfaces comprising one clamping surface and an opposing clamping surface facing each other; and
   compression means to move at least one of said clamping surface toward said opposing clamping surface.

20. The apparatus as recited in claim 19 wherein said compression means further comprises:
   a release means to move at least one of said opposing clamping surfaces away from said opposing clamping surface.

21. The apparatus as recited in claim 20 wherein said clamp assembly further comprises:
   opposing clamps, one clamp and an opposing clamp having a one clamp end and an opposing clamp end respectively,
   said one clamp having a clamp head and comprising a clamp slide slidably connected to said one clamp head, said clamp slide capable of sliding away from said clamp end, said clamp slide having said one clamping surface interconnected thereto,
   said opposing clamp having an opposing clamp head and comprising an opposing clamp slide slidably connected to said opposing clamp head, said opposing clamp slide capable of sliding away from said opposing clamp end, said opposing clamp slide having said opposing clamping surface interconnected thereto, said one clamp and said opposing clamp being interconnected with said one clamping surface facing said opposing clamping surface; and,
   at least one of said one clamp and said opposing clamp comprising a clamp slide sensor to sense movement of at least one of said clamp slides away from said respective clamp end.

22. An apparatus comprising:
   a frame;
   a slide system mounted to said frame, said slide system comprising:
   a slide support connected to a slide conveyor, said slide conveyor comprising:
   at least one driven chain between a supported free sprocket and a driven sprocket with said slide support interconnected to said driven chain;
   driving means interconnected to said driven sprocket;
   at least one clamp assembly connected to said slide support, said clamp assembly comprising:
   opposing clamps, one clamp and an opposing clamp having a one clamp end and an opposing clamp end respectively,
   said one clamp end having a clamp head and comprising a clamp slide slidably connected to said one clamp head, said clamp slide capable of sliding away from said clamp end, said clamp slide having a clamping surface interconnected thereto,
   said opposing clamp having a clamp head and comprising an opposing clamp slide slidably connected to said opposing clamp head, opposing clamp slide capable of sliding away from said opposing clamp end, said opposing clamp slide having an opposing clamping surface interconnected thereto, said one clamp and said opposing clamp being interconnected with said one clamping surface facing said opposing clamping surface;
   compression means to move at least one of said clamping surfaces toward said opposing clamping surface;
   at least one of said one clamp and said opposing clamp comprising a slide sensor to sense movement of at least one of said clamp slides away from said respective clamp end; and
   means to stop said driving means in response to a signal from said slide sensor.

23. An apparatus comprising:
   opposing clamps, one clamp and an opposing clamp having one clamp end and an opposing clamp end respectively,
   said one clamp having a clamp head and comprising a clamp slide slidably connected to said one clamp head, said clamp slide capable of sliding away from said clamp end, said clamp slide having a clamping surface interconnected thereto,
   said opposing clamp having an opposing clamp head and comprising an opposing clamp slide slidably connected to said opposing clamp head, said opposing clamp slide capable of sliding away from said opposing clamp end, said opposing clamp slide having an opposing clamping surface interconnected thereto, said one clamp and said opposing clamp being interconnected with said one clamping surface facing said opposing clamping surface;
   compression means to move at least one of said one clamping surface toward said opposing clamping surface;
   at least one of said one clamp and said opposing clamp comprising a clamp slide sensor to sense movement of at least one of said clamp slides away from said respective clamp end.

* * * * *